United States Patent [19]

Rittenbach

[11] 3,731,310
[45] May 1, 1973

[54] OPERATING PROXIMATE RADARS WITH INTERLACED SPECTRAL LINES

[75] Inventor: Otto E. Rittenbach, Neptune, N.J.

[73] Assignee: The United States of America as represented by the Secretary of the Army

[22] Filed: June 30, 1971

[21] Appl. No.: 158,358

[52] U.S. Cl..........343/17.1 R, 343/5 R, 343/17.1 PF
[51] Int. Cl................................................G01s 9/02
[58] Field of Search......................343/5 R, 6.5, 17.1, 343/17.1 PF; 325/53

[56] References Cited

UNITED STATES PATENTS 3,412,396  11/1968  Mooney, Jr............................343/5 R
1,904,544  4/1933  Schmied..................................325/53
3,161,870  12/1964  Pincoffs..................................343/5 R
3,378,835  4/1968  Mooney, Jr. et al....................343/5 R

*Primary Examiner*—Malcolm F. Hubler
*Attorney*—Edward J. Kelly et al.

[57] ABSTRACT

A plurality of radars are operated in the same electronic spectrum segment and, though close enough to one another to intercept reflected or direct beam energy from one another, they do not interfere. All the radars are coherently pulsed at the same pulse repetition frequency. Their carrier frequencies differ by frequency steps that are equal to a fraction of the pulse repetition frequency so that the spectral lines of the respective radars interlace. All of the radars may utilize a common reference frequency source for their carrier frequencies.

9 Claims, 5 Drawing Figures

INVENTOR,
OTTO E. RITTENBACH

Patented May 1, 1973

INVENTOR,
OTTO E. RITTENBACH

BY Arthur L. Bowers AGENT
Harry M. Saragovitz
Edward J. Kelly & Herbert Berl
ATTORNEYS

OPERATING PROXIMATE RADARS WITH INTERLACED SPECTRAL LINES

BACKGROUND OF THE INVENTION

Heretofore, two or more pulsed radars that needed to be located so close to one another that if they operated in the same or overlapping bands they would interfere with one another, were operated in well-separated frequency bands to avoid any interference. This was a satisfactory method of operation when there was ample available space in the assigned electronic spectrum segment. However, usage of radar and other electronic equipments mushroomed. In a region where the demands on the spectrum were so great at a particular time that there was not sufficient spectrum space available for operating the needed number of radars in well-separated bands, the spectrum limitations meant less than adequate radar coverage.

SUMMARY OF THE INVENTION

An object of this invention is to operate two or more radars within the same or overlapping frequency bands where the radars are located close enough to one another to interfere.

A further object is to make more efficient use of an electronic spectrum segment assigned for radar use by operating a number of radars in the same spectrum segment at the same time without mutual interference.

In accordance with this invention, two or more radars are operated in the same segment of the electronic spectrum and are located sufficiently close together to interfere, are all in coherent pulse operation, all operate at the same pulse repetition frequency, and all operate at carrier frequencies that differ just enough so that the spectral lines of the radars interlace. The bandwidths of the spectral lines are minimized.

BRIEF DESCRIPTION OF THE DRAWINGS

The exact nature of this invention will be readily apparent from consideration of the following specification in view of the annexed drawings in which.

DESCRIPTION OF THE PREFERRED EMBODIMENT

Figure 1:
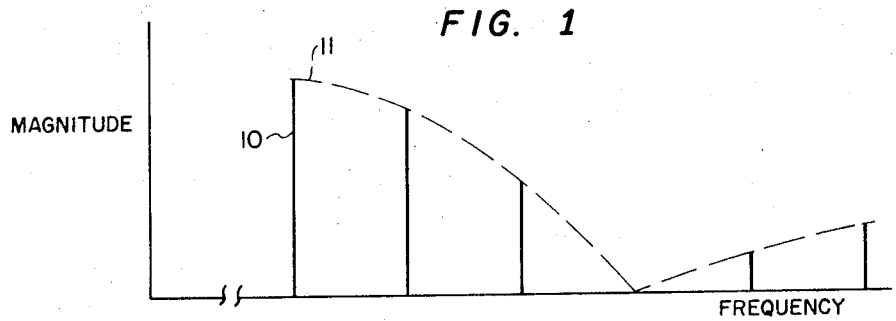
FIG. 1 is a graphical showing of theoretical single-frequency spectral lines constituting part of the spectrum of a pulsed radar.

A radar operating at a constant carrier frequency and coherently pulsed at a constant repetition rate generates r.f. power having a theoretical frequency characteristic that includes spectral lines 10 as shown in FIG. 1. Each spectral line 10 is a pure or single frequency and successive spectral lines are spaced apart by a frequency equal to the pulse repetition frequency. The magnitude distribution is derived by Fourier analysis. Broken line 11 is an envelope of the relative magnitudes of the spectral lines. Magnitude at the carrier frequency is greater than at the frequencies represented by the other spectral lines. Only part of the spectrum of one radar is shown. The effective range of each spectral line frequency is dependent on the magnitude at that frequency whereby the effective spectrum of the radar is restricted to those lines that exceed a predetermined useful magnitude level; spectral lines at lower magnitude levels do not contribute to the effective spectrum.

Figure 2:
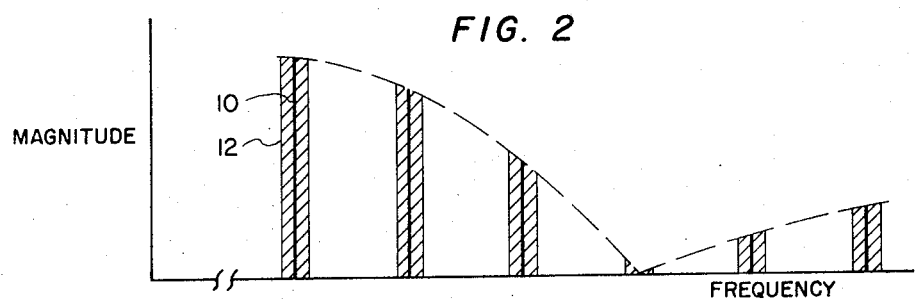
FIG. 2 differs from FIG. 1 in that the spectral lines are shown realistically, namely as frequency bands.

Each mathematically calculated spectral line 10 is at the center of a band 12 as illustrated in FIG. 2. The band of each spectral line may be considered the effective width of each spectral line and derives from several modulations. Amplitude and phase jitter in the transmitter is responsible for part of the bandwidth of the spectral lines. Relative motion between the radar antenna and detected objects contribute motional modulation which often is responsible for the major part of the bandwidth of the spectral lines.

The spacing between spectral lines of one radar as shown in FIG. 2 is exaggerated for illustration. Pulse repetition frequency needs to be double the effective widths of the spectral lines plus at least the width needed for doppler filter skirt. For example, assuming effective widths of the spectral lines due to all factors including doppler shift is a maximum of ±500Hz, the pulse repetition frequency may be somewhat over 3000Hz assuming doppler filter skirt is 500Hz. In employing the teachings of this invention, pulse repetition frequency is set at a multiple of the effective width of the spectral lines, the selected multiple being related to the number of radars operated in the vicinity of one another. To illustrate, if the pulse repetition frequency is set at ten times that in the above example for one radar, e.g., 30,000Hz, the frequency steps between spectral lines are increased by a factor of 10, whereby there are unused frequency gaps of 29,000Hz between successive spectral lines of the one radar. A total of 20 radars may be operated in the same spectrum segment with the spectral line lines of all the radars interlaced.

For interlaced operation, the carrier frequencies of the two or more radar transmitters must be essentially stable. The stability required can in one example be assured by locking to a crystal oscillator located in each transmitter.

Alternatively, one frequency source may be used to assure coherence between signals and prevent relative shifting among the sets of spectral lines. All the radars may be cable-coupled or RF linked to one master frequency source provided they are close enough to one another.

Figure 3:
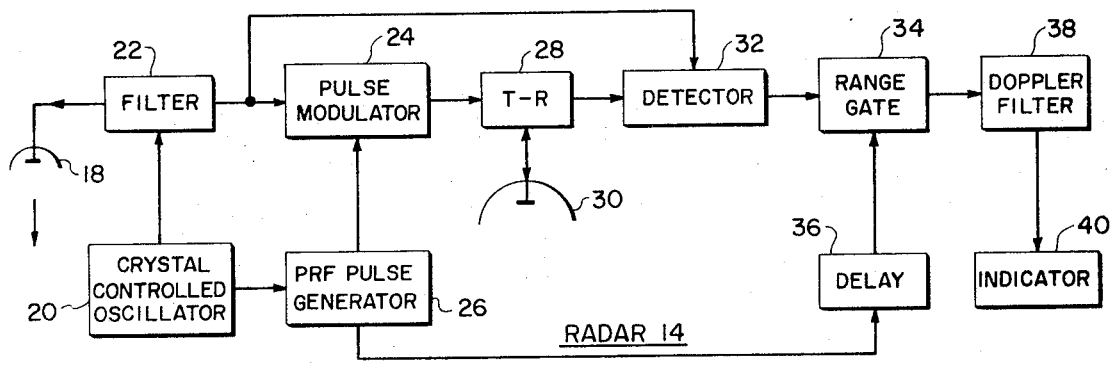
FIGS. 3 and 4 are simplified block diagrams of proximate interlocked radars.
Figure 4:
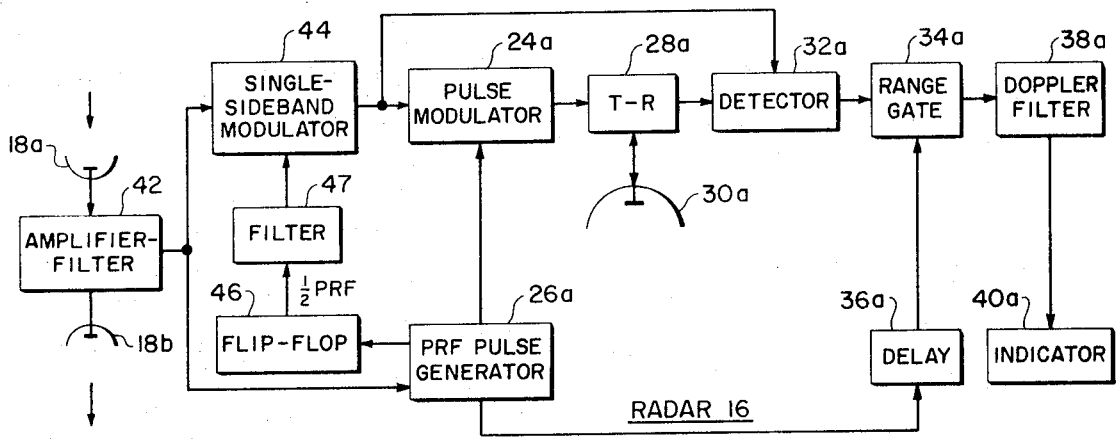
Figure 5:
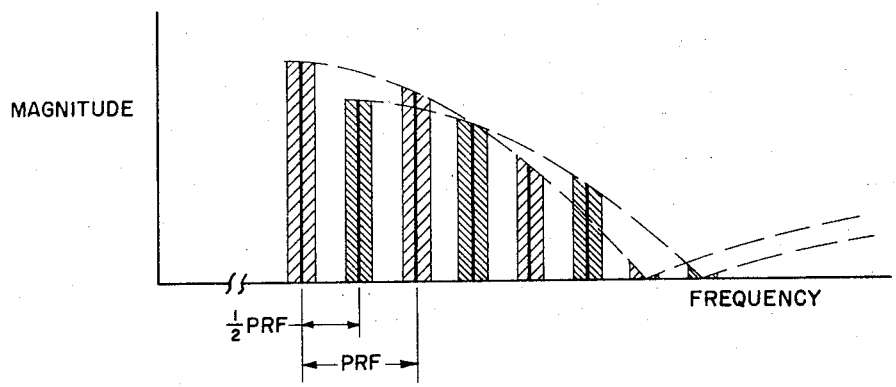
FIG. 5 shows interlaced spectral lines of two interlocked radars as in FIGS. 3 and 4.

In FIGS. 3 and 4, two radars 14 and 16 sited sufficiently proximate for mutual interference if operated in the same frequency band are operated so that their spectral lines interlace as shown in FIG. 5. Radars 14 and 16 have auxiliary antennas 18 and 18a for use in locking the carrier of the transmitter of radar 16 to the carrier of radar 14.

Auxiliary antennas 18 and 18a are beamed toward one another. Radar 14 has a crystal controlled oscillator 20 to generate its carrier frequency. The generated carrier frequency energy divides at filter 22, a minor fraction being coupled to antenna 18 which beams the carrier as CW to antenna 18a of radar 16. Otherwise, radar 14 is conventional. The major portion of the generated carrier energy is coupled from filter 22 to pulse modulator 24. Pulse generator 26 delivers a train of pulses at a predetermined pulse repetition frequency to modulator 24 and the latter couples its output to T-R 28 to which is coupled the main antenna 30. Pulse generator 26 may be free running or may be locked for stability to the carrier frequency as shown in FIG. 3. Returned echoes and the original carrier from filter 22 are beaten against each other in detector 32. A range gate 34 connected to the output of detector 32 is controlled by a portion of the pulse energy output of pulse generator 26 coupled through delay circuit 36 adjusted for the desired range. The output of range gate 34 is coupled through doppler filter 38 and otherwise conventionally processed and coupled to an audio or visual indicator 40.

In radar 16 the intercepted CW carrier frequency energy from radar 14 is coupled through amplifier-filter 42 to single sideband modulator 44. A second input to SSB modulator 44 is sinusoidal energy at a frequency equal to one-half the pulse repetition frequency of the output of pulse generator 26a, obtained from filter 47 connected to the output of flip-flop 46, the latter being driven by a fraction of the output energy of pulse generator 26a. The pulse repetition frequencies of the outputs of pulse generators 26 and 26a are essentially identical. It is contemplated that within the scope of this invention the single sideband modulator 44 is designed to deliver either the upper or lower sideband. The other elements of radar 16 perform the same function as their counterpart elements in radar 14 identified by the same reference characters. Where more than two radars are to operated in the manner described, a down counter is used in place of flip-flop 46 in each of the radars 16. Also where there are two or more radars 16 the intermediate radars 16 may be provided with an antenna 18b for repeater operation so that all the radars 16 need not be in sight of radar 14.

Antenna patterns and physical siting geometry must be studied carefully when closely spaced radars share a spectrum lest direct radiation from one radar saturate or even damage the receiver of another. Receiver dynamic range must be adequate to accommodate the worst condition of interference. Main lobe interference usually can be avoided by carefully siting the antennas. Antenna orientation must be chosen carefully to avoid ambiguity caused by reflection from a target illuminated by another radar. Ambiguity is avoided if the area of surveillance is subdivided, each sector being assigned to a respective radar and additionally if scanning is synchronized so that maximum separation between beams is maintained. The efficient spectrum usage achieved with this invention is optimized when the spacing between interlaced spectral lines is minimized. One factor that contributes to the width of the frequency band associated with each spectral line is instability of the transmitted signal. Therefore, pulse-to-pulse amplitude and phase jitter, as well as long-term frequency drift must be minimized. Transmitter instabilities are less significant if the carrier frequencies of all the cooperating radars are derived from one source via cable connection or RF link. If all the carrier frequencies are not derived from one source, very stable frequency sources must be used in the respective radars with provision for periodic resynchronizing by any of the techniques known in the art.

Poor pulse shaping and deviations from ideal coherence in pulsing contribute to widening the spectral line bandwidth. Both these factors should be kept as low as possible.

Interfering signals in the receiver is another factor contributing to the width of spectral lines. In part, this factor concerns the degree of the receiver's insensitivity to signals outside the doppler band of interest and thus the sharpness of the moving target indicator (MTI) filters. The frequency characteristics of the filters should be as steep-sided as is practical. Doppler bandwidth is perhaps the most significant factor which contributes to the band around each spectral line and ordinarily cannot be reduced except by selection of lower RF.

Scanning modulation, which also contributes to the effective width of the spectral lines may be reduced by electronic step scanning. However, in most doppler radars this factor is small in comparison to the doppler band, by design.

Within the limits of available spectrum space, spectral line spacing may be increased by increasing PRF. The maximum-unambiguous-range sets an upper limit to PRF which should be no greater than $c/(2 \cdot PRF)$ where $c$ is the velocity of light.

While the invention has been described in connection with an illustrative embodiment, obvious modifications thereof are possible without departing from the spirit of the invention. Accordingly, the invention should be limited only by the scope of the appended claims.

What is claimed is:

1. The method of operating a plurality of radars in a common spectrum segment with interlaced spectral lines where their siting separation is such that there can be mutual interference, comprising: operating all of said radars without mechanical scan and at the same pulse repetition frequency and in coherent pulse operation, and at respective carrier frequencies that differ from one another by approximately the pulse repetition frequency divided by a number equal to or greater than the number of radars, the pulse repetition frequency exceeding the sum of the bandwidths of respective spectral lines of the plurality of radars.

2. The method in claim 1 further including transmitting CW carrier frequency energy of one of the radars to each of the other radars and modulating at each of the other radars the CW energy at the frequency of the carrier of said one radar to produce the carrier frequencies of the other radars.

3. The method in claim 2 wherein two radars are operated in the common spectrum segment and wherein the other radar is operated at a carrier frequency which differs from the carrier frequency of said one radar by approximately one-half the pulse repetition frequency.

4. The method in claim 2 wherein three radars are operated in the common spectrum segment and wherein the other two radars are operated at carrier frequencies which are greater than and less than, respectively the carrier frequency of said one radar by about one-third of the pulse repetition frequency.

5. The method in claim 2 wherein three radars are operated in the common spectrum segment, and wherein the other two radars are operated at carrier frequencies which are greater than the carrier frequency of said one radar by one-third and two-thirds respectively of the pulse repetition frequency.

6. The method in claim 2 wherein three radars are operated in a common spectrum segment and wherein the other two radars are operated at carrier frequencies which are lower than the carrier frequency of said one radar by one-third and two-thirds respectively of the pulse repetition frequency.

7. In combination, a plurality of pulsed radars for operation in a common spectrum segment and operable at the same pulse repetition frequency, only one of said radars having carrier frequency generating means, said one radar and each of said other radars having cooperating means whereby said one radar can transfer continuously to all of said other radars carrier frequency energy generated in said one radar, means in each of said other radars for converting the transferred carrier frequency of said one radar to a carrier frequency which differs therefrom by approximately the pulse repetition frequency divided by a number equal to or greater than the number of radars and differs from the other carrier frequencies.

8. The combination defined in claim 7 wherein the carrier frequency converting means in each of said other radars includes single sideband carrier means to produce its respective carrier by interacting the carrier frequency of said one radar with a frequency which is a selected fraction of the pulse repetition frequency.

9. In combination, a plurality of pulsed radars for operation in a common spectrum segment and operable at the same pulse repetition frequency, one only of said radars including carrier frequency generating means, said one radar including a PRF pulse generator coupled to the carrier frequency generating means and locked to the carrier frequency, said one radar and each of said other radars having cooperating means whereby all of said other radars obtain carrier frequency energy the same as is generated in said one radar, modulator means in each of said other radars operable for converting the obtained carrier frequency energy to a carrier frequency which differs from the obtained carrier frequency by approximately the pulse repetition frequency divided by a number equal to or greater than the number of said radars, each of said other radars including means for providing a modulating frequency input to said modulator means and a PRF generator locked to the obtained carrier output frequency and coupled to the means that provides the modulating frequency whereby the frequency of the latter is locked to the frequency of the PRF pulse generator, the modulating frequency means of said other radars all providing different output frequencies.

* * * * *